Dec. 25, 1923.
W. S. GAUNTT
VEHICLE WHEEL
Filed Jan. 30, 1922
1,478,852
2 Sheets-Sheet 1
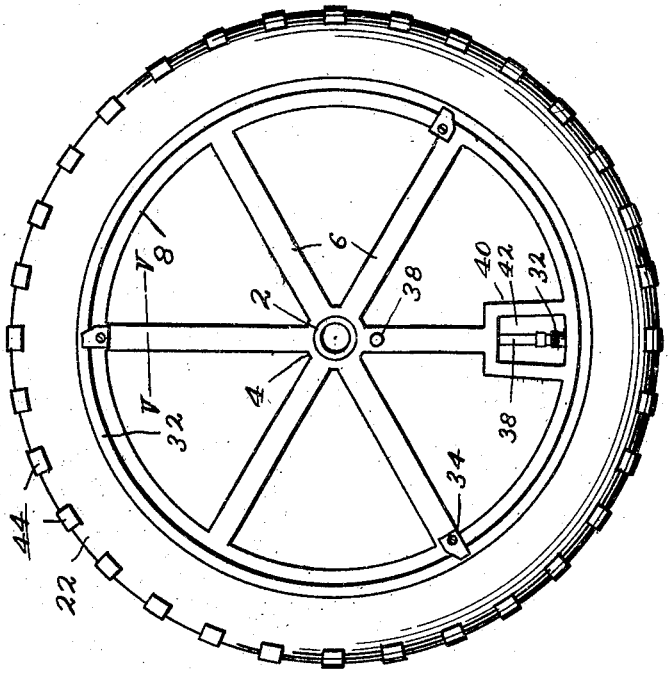
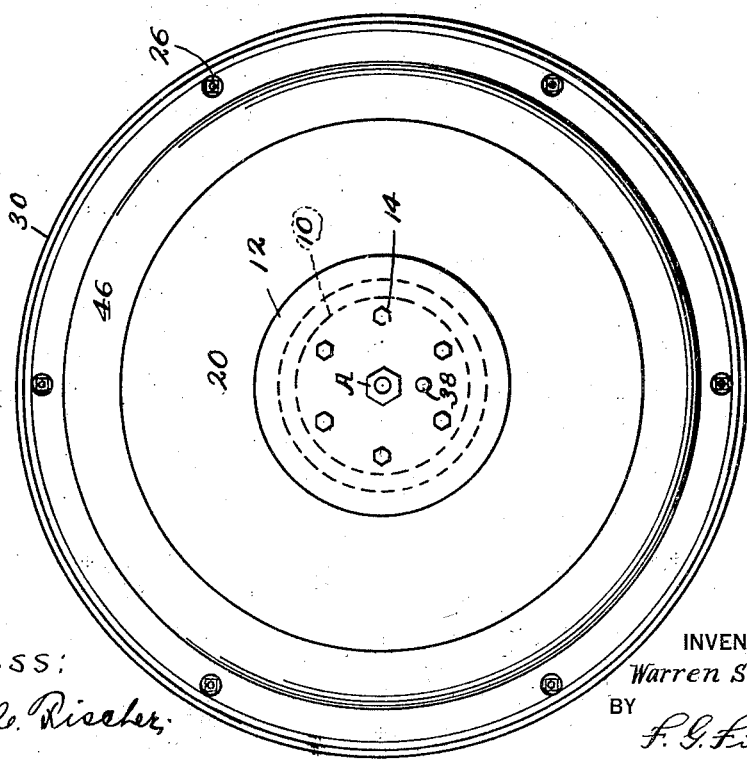
Witness:
Dred C. Rischer
INVENTOR:
Warren S. Gauntt,
BY
F. G. Fischer,
ATTORNEY.

Dec. 25, 1923.
W. S. GAUNTT
VEHICLE WHEEL
Filed Jan. 30, 1922   2 Sheets-Sheet 2
1,478,852
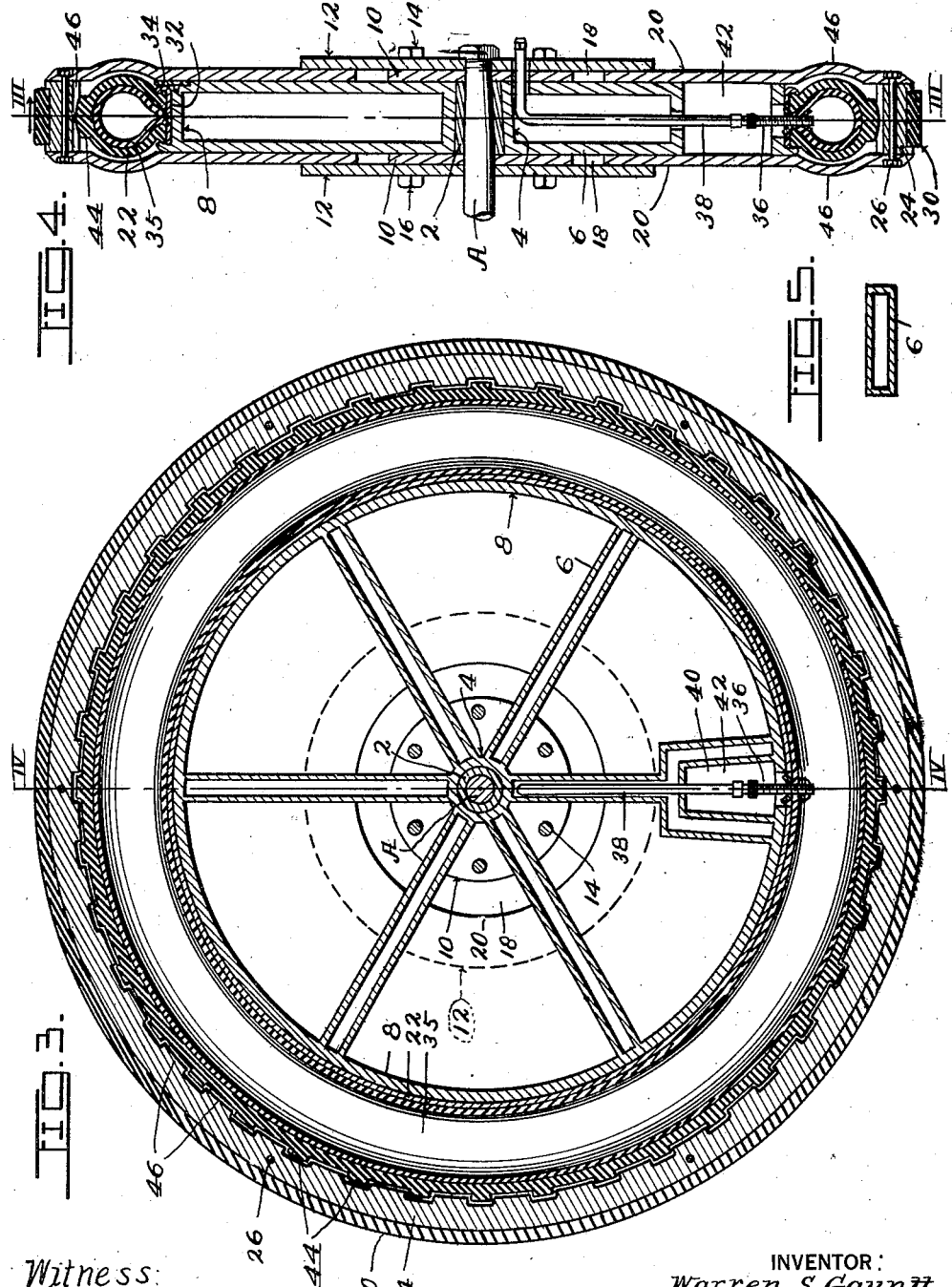
INVENTOR:
Warren S. Gauntt,
BY
F. G. Fischer,
ATTORNEY.

Patented Dec. 25, 1923.

1,478,852

UNITED STATES PATENT OFFICE.

WARREN S. GAUNTT, OF WALDRON, MISSOURI.

VEHICLE WHEEL.

Application filed January 30, 1922. Serial No. 532,813.

*To all whom it may concern:*

Be it known that I, WARREN S. GAUNT, a citizen of the United States, residing at Waldron, in the county of Platte and State of Missouri, have invented certain new and useful Improvements in Vehicle Wheels, of which the following is a specification.

My invention relates to resilient wheels for motor and other vehicles, and it embraces an inner resilient tire and a punctureproof casing to protect said tire from contact with the ground and damage arising therefrom, such as punctures, rim cuts, etc.

The casing consists of individual rigid elements which, however, are so assembled as to permit the enclosed tire to perform its function of absorbing shock and vibration incident to running over the road.

In order that the invention may be fully understood, reference will now be made to the accompanying drawings, in which:

Fig. 1 is a side elevation of the wheel.

Fig. 2 is a detail elevation of the wheel with some of the parts removed.

Fig. 3 is an enlarged sectional view of the wheel.

Fig. 4 is an enlarged central vertical section on line IV—IV of Fig. 3.

Fig. 5 is a cross section of one of the spokes on line V—V of Fig. 2.

In carrying out the invention, I employ a boxing 2 which fits into a hub 4 provided with spokes 6 connected at their outer ends to a felly 8. The foregoing parts are, preferably, made of two pieces of sheet metal brazed or otherwise secured together, and in order to lend rigidity to the spokes 6 the same are formed rectangular in cross section as disclosed by Fig. 5. The boxing 2 is rigidly secured within the hub 4 to protect the same from wear and may be either loosely mounted upon the axle A, or rigidly mounted thereon according to whether the wheel is to run free or be employed as one of the drive wheels of the vehicle.

10 designates a pair of disks placed against the ends of the boxing 2 and the hub 4 and overlapping the spokes 6 to space therefrom a pair of circular plates 12 secured to said disks 10 by a plurality of bolts 14, the nuts 16 of which are drawn up tightly to hold the disks 10 in frictional engagement with the hub 4 and the spokes 6, so that they will rotate together.

The plates 12 are of greater diameter than the disks 10 to leave spaces 18 for the reception of a pair of annular plates 20, which, although fitting snugly within said spaces 18, are sufficiently loose to move therein to allow the inner tire 22 to perform its function of absorbing shock and vibration as will hereinafter appear. The outer margins of the annular plates 20 are removably connected to an outer rim 24 by bolts 26, and said outer rim 24 is equipped with a tire 30.

32 designates an inner demountable rim which is held in position upon the felly 8 by retaining-plates 34 and upon which the inner tire 22 is mounted. The inner tube 35 of the tire 22 is provided with the usual valve and stem 36 to which a small rubber or other pipe 38 is connected. The pipe 38 extends through one of the hollow spokes 6 and out through registering openings in one of the disks 10 and the circular abutting plate 12, so that it may be connected to an air pump when the tire 22 is to be inflated. In order that access may be had to the stem 36 to connect or disconnect the pipe 38 when the tire 22 is to be placed in position or removed from the wheel, the spoke through which said pipe 38 extends is bifurcated as indicated at 40, to provide an opening 42 into which the hand may be inserted.

The tire 22 is provided with spaced peripheral projections 44 to engage with complemental projections 46 on the inner side of the rim 24 to overcome all danger of said rim 24 creeping upon the tire 22 when running on the road.

With the parts constructed and arranged as above set forth, it is apparent that the inner tire 22 and the demountable rim 32 can be readily placed in position upon the felly 8 by removing one of the circular plates 12 and the adjacent annular plate 20, and when the parts are assembled the tire 22 is free to expand or contract owing to the freedom of movement of the annular plates 20 in the spaces 18. As disclosed on Fig. 4, the annular plates 20 have annular convex portions 46 to provide ample room for the sides of the tire 22 to bulge laterally when the thread thereof is forced inwardly by pressure of the load thereon.

From the foregoing description it will be understood that when the parts are assembled the inner tire 22 is enclosed within an annular chamber 50 formed by the felly 8, the outer rim 24, and the annular plates 20, which fully protect said inner tire 22 from punctures, rim cuts and other damage; and while I have shown and described the preferred arrangement, construction, and combination of parts, I reserve the right to make such changes as properly fall within the spirit and scope of the appended claim.

Having thus described my invention, what I claim and desire to secure by Letters Patent, is:

In a wheel of the character described, a hub, a felly, tubular spokes connecting said hub and felly, a demountable rim on said felly, a resilient tire mounted upon said rim, an outer rim surrounding said resilient tire, annular plates connected to said outer rim and slidably engaging the spokes to permit compression of the resilient tire, disks secured to the spokes and of less diameter than the inner periphery of said annular plates to leave working room therefor, circular plates secured to said disks and overlapping the annular plates, and a tire mounted upon the outer rim.

In testimony whereof I affix my signature, in the presence of two witnesses.

WARREN S. GAUNTT.

Witnesses:
L. J. FISCHER,
F. C. FISCHER.